(12) United States Patent
Menovcik et al.

(10) Patent No.: US 7,816,449 B2
(45) Date of Patent: *Oct. 19, 2010

(54) COATING COMPOSITION FOR ADHESION TO OLEFINIC SUBSTRATES

(75) Inventors: Gregory G. Menovcik, Northville, MI (US); William H. Merritt, Ferndale, MI (US); Walter H. Ohrbom, Hartland Township, MI (US)

(73) Assignee: BASF Coatings GmbH, Muenster (DE)

( * ) Notice: Subject to any disclaimer, the term of this patent is extended or adjusted under 35 U.S.C. 154(b) by 1198 days.

This patent is subject to a terminal disclaimer.

(21) Appl. No.: 11/021,799

(22) Filed: Dec. 23, 2004

(65) Prior Publication Data

US 2005/0131151 A1    Jun. 16, 2005

Related U.S. Application Data

(63) Continuation-in-part of application No. 09/707,513, filed on Nov. 7, 2000, now abandoned, and a continuation-in-part of application No. 10/420,046, filed on Apr. 21, 2003, now Pat. No. 6,939,916.

(60) Provisional application No. 60/531,964, filed on Dec. 23, 2003.

(51) Int. Cl.
    *C08L 53/00* (2006.01)
(52) U.S. Cl. ........................................ 525/91
(58) Field of Classification Search ............... 525/91
    See application file for complete search history.

(56) References Cited

U.S. PATENT DOCUMENTS

| 3,455,859 | A | * | 7/1969 | Korpman | 428/346 |
| 3,666,701 | A | * | 5/1972 | Marrs | 524/272 |
| 4,039,593 | A | * | 8/1977 | Kamienski et al. | 568/857 |
| 4,898,965 | A | * | 2/1990 | Kinoshita et al. | 558/416 |
| 5,863,646 | A | * | 1/1999 | Verardi et al. | 428/323 |
| 6,300,414 | B1 | * | 10/2001 | McGee et al. | 525/165 |
| 6,939,916 | B2 | * | 9/2005 | Merritt et al. | 525/91 |

FOREIGN PATENT DOCUMENTS

| EP | 1 275 670 | 1/2001 |
| EP | 1 172 407 | 6/2001 |
| WO | WO 02/38689 | 5/2002 |

OTHER PUBLICATIONS

International Search Report and Written Opinion for PCT/US2004/043446, International Filing Date Dec. 23, 2004.

* cited by examiner

*Primary Examiner*—Randy Gulakowski
*Assistant Examiner*—Alicia M Toscano
(74) *Attorney, Agent, or Firm*—Harness, Dickey & Pierce, P.L.C.

(57) ABSTRACT

The present invention is an adhesion promoter, a coating composition containing the adhesion promoter and a method for preparing the adhesion promoter and coating. The adhesion promoter of the present invention is an olefin based polymer prepared by reacting a hydroxy functional olefin polymer with a compound reactive with hydroxy functionality to provide functionality on the olefin polymer that is inert to reaction with a principal resin or crosslinking resin in a coating composition.

17 Claims, No Drawings

COATING COMPOSITION FOR ADHESION TO OLEFINIC SUBSTRATES

CROSS REFERENCE TO RELATED APPLICATIONS

This application is a continuation in part of U.S. patent application Ser. No. 09/707,513, filed Nov. 7, 2000 and U.S. patent application Ser. No. 10/420,046, filed Apr. 21, 2003.

FIELD OF THE INVENTION

This invention concerns adhesion promoters, curable coating compositions, especially compositions that are applied over olefinic substrates, particularly thermoplastic polyolefin (TPO) substrates and a method of making said coatings.

BACKGROUND OF THE INVENTION

Adhesion additives are known throughout the automotive coatings industry. As is understood by those skilled in the art, adhesion additives are used as components in primer surfacers, or other intermediate coating compositions, to promote adhesion between a substrate and a topcoat system for an automobile, such as a topcoat system including a flexible basecoat and flexible clearcoat. In general, plastic substrates may be coated with curable, or thermosettable, coating compositions. Color-plus-clear composite coatings have been particularly useful as topcoats for-which exceptional gloss, depth of color, distinctness of image, or special metallic effects are desired. Adhesion additives are primarily used in primer surfacers, typically solvent-borne primer surfacers, but may also be used in water-borne primer surfacers, that are applied to a bumper, i.e., facie, or other trim component as the substrate. Typically, these substrates are made up of thermoplastic polyolefin (TPO), and without the inclusion of an adhesion copolymer in an intermediate solvent-borne primer surfacer layer, the topcoat system may delaminate from the TPO substrate.

One example of an adhesion additive is chlorinated polyolefin. Other adhesion additives are olefin-based based polymers or copolymers that have an olefin block that is substantially saturated and at least one (poly)ester or (poly)ether block. The olefin-based block polymer or copolymer is typically present in an organic solvent such as xylene, toluene, and the like. The individual components of the adhesion copolymers, i.e., the olefin-based polymer or block copolymer, frequently settle out into the organic solvent. This settling renders the adhesion polymer or copolymer unstable, i.e., having poor shelf stability, and therefore, not suitable for use as a component of a solventborne primer. These are described in U.S. Pat. Nos. 6,300,414 and 4,898,965. These patents, however, do not include chlorinated polyolefin as an adhesion additive.

Adhesion promoters including chlorinated polyolefin and a diene polymer are taught in U.S. Pat. No. 5,863,646. However these coatings demonstrate less effective adhesion and humidity resistance than olefin-based copolymers of the present invention.

It would be desirable to provide a coating composition comprising a more stable adhesion promoter that provides improved physical properties, including improved adhesion under harsh testing conditions, improved conductivity and improved humidity resistance.

SUMMARY OF THE INVENTION

The present invention provides an adhesion promoting composition that is an olefin based polymer or block copolymer or mixture of these, comprising adhesion promoting functional groups that do not react with a principal resin or crosslinking resin in a coating composition and a coating composition containing the adhesion promoter. The present invention provides a method for preparing the adhesion promoter and the coating containing the adhesion additive. The olefin based polymer can be prepared by reacting a hydroxy functional olefin polymer, such as those produced by hydrogenation of a polyhydroxylated polydiene polymer, with a compound to provide acid, thiol, carbamate, amine, amide, urea, phenol or any other hydrogen donor or hydrogen acceptor functionality on the polymer that does not react with principal or crosslinking resins present in a coating composition.

The olefin based block co-polymer can be made by the reaction of a functional olefin based polymer with a chain-extension reagent selected from the group consisting of lactones, hydroxy carboxylic acids, oxirane, alkylene oxides, isocyanate functional polyurethane pre-polymers made from the partial reaction of a polyfunctional isocyanate with a combination of polyols, polyamines, hydroxyamines and/or optionally, a capping agent that contains monofunctional alcohols or amines and where the capping agent additionally has a functionality selected from the group consisting of ureas, carbamates, phenolics and mixtures thereof, wherein said chain-extension reagent forms a modifying block of the block copolymer.

As used herein the olefin based adhesion promoter refers to both the olefin based polymer and olefin based block copolymer.

DETAILED DESCRIPTION OF THE INVENTION

As used throughout, ranges are used as a short hand for describing each and every value that is within the range. Any value within the range can be selected as the terminus of the range. The adhesion promoter of the present invention comprises at least an olefin-based polymer or copolymer having a functionality thereon that is substantially non-reactive with the film forming components of a coating composition when subjected to curing conditions. The olefin-based polymer or copolymer of the invention is prepared from saturated or substantially saturated polyolefin preferably having a number average molecular weight of from about 1000 up to about 5000, more preferably from about 1000 up to about 3500, and even more preferably from about 1500 up to about 3500. The adhesion promoter is used in a coating to promote adhesion to a substrate, preferably a TPO substrate.

The olefin based polymer can be produced by hydrogenation of a polyfunctional polydiene polymer. The polydiene polymer can have any functional group that is an active hydrogen donor, or a group that is converted to an active hydrogen donor and is not reactive with functionality on a principal or crosslinking resin in a coating composition containing the olefin based polymer. Polyacid and polyhydroxylated polydiene polymers are most frequently utilized due to their commercial availability. Polyhydroxylated polydiene polymers may be produced by anionic polymerization of monomers such as isoprene or butadiene and capping the polymerization product with alkylene oxide and methanol, as described in U.S. Pat. Nos. 5,486,570, 5,376,745, 4,039,593, and Reissue 27,145, each of which is incorporated herein by reference. The polyhydroxylated polydiene polymer is substantially saturated by hydrogenation of the double bonds that is at least 90 percent, preferably at least 95% and even more preferably essentially 100% complete to form the hydroxyl-functional olefin polymer. The hydroxyl equivalent weight of the hydroxyl-functional saturated olefin polymer may be from about 500 to about 20,000. The hydroxy functional olefin-based polymer thus prepared is then reacted with a compound reactive with the hydroxyl functionality to provide a functionality that is non-reactive with a principal resin or crosslinking resin in a coating composition. Such non-reactive functionality includes thiol, acid, epoxy and hydrogen donor and/or acceptor functionality.

Alternatively, the olefin-based polymer may comprise a block copolymer that has an olefin block and at least one (poly)ester, (poly)urethane or (poly)ether block. By the terms "(poly)ester block" "(poly)urethane block" and (poly)ether block" it is meant that the base polyolefin material is modified with one or more monomer units through formation of, respectively, ester, urethane or ether linkages. For purposes of the present invention, "(poly)ester block" has a special meaning that, in the case of two or more monomer units, the monomer units are predominantly, preferably exclusively, arranged in head-to-tail linkages. Thus, the arrangement of the ester linkages in the (poly)ester block or blocks may be represented by

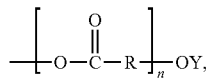

in which n represents the number of monomer units, R represents the part of each monomer unit between the ester groups (which may be all the same if only one type of monomer is used or different for individual units if a mixture of different monomers is used), and Y represents the endgroup of the block. The monomer units should be arranged exclusively in the head-to-tail arrangement, although it is possible, particularly in longer blocks, for there to be some variation; in the latter case, the arrangement should still be predominantly head-to-tail. Preferred embodiments for n, R, and Y are described below.

The olefin-based polymer can be prepared by reacting an hydroxyl-functional, saturated or substantially saturated olefin polymer with a chain-extension reagent that is reactive with hydroxyl groups and will polymerize in a head-to-tail arrangement of monomer units. Such chain-extension reagents include, without limitation, lactones, hydroxy carboxylic acids, oxirane-functional materials such as alkylene oxides, and combinations of these. Examples of chain-extension reagents are lactones and alkylene oxides. Specific examples of these include epsilon caprolactone, ethylene oxide, and propylene oxide. The hydroxy groups on the olefin-based block polymer thus formed are in turn reacted with a compound to provide. adhesion-promoting functional groups that do not react with a principal resin or a crosslinking resin of a coating composition.

Preferably, the block polymer has one block of the olefin material to which is attached one or more of the (poly)ester, (poly)urethane and/or (poly)ether blocks. In one embodiment, the olefin-based block copolymer of the invention can be represented by a structure selected from

in which A represents an olefin block, B represents a (poly) ester, (poly)urethane or (poly)ether block or combinations thereof, F is a functional group that does not react with a principal resin or crosslinker in the coating composition and m is on average from about 0.7 to about 10, alternatively from about 1.7 to about 2.2 or from about 1.9 to about 2, and n is on average from 2 to 4.

The A block is a saturated or substantially saturated olefin polymer. In one embodiment, the A block is substantially linear. In general, about 15% or less of the carbons of the A block should be pendant to the olefin polymer backbone. Preferably 10% or less, more preferably 8% or less of the carbons of the A block should be pendant to the olefin polymer backbone. Each B block preferably contains, on average, from about 0.5 to about 25 monomer units, more preferably on average from about 2 to about 10, and even more preferably on average from about 2 to about 6 monomer units per hydroxyl group of the unmodified olefin block. The monomer units may be the same or there may be different monomer units in a single (poly)ester, (poly)urethane or (poly)ether block. For example, a (poly)ether block may have one or more ethylene oxide units and one or more propylene oxide units.

In both the olfin polymer and block copolymer, the hydroxyl-functional olefin polymer utilized is preferably a hydroxyl-functional hydrogenated polymer of butadiene with ethylene, propylene, 1,2 butene, and combinations of these. The olefin polymers may have a number average molecular weight of preferably from about 1000 to about 10,000, more preferably from about 1000 to about 5000, even more preferably from about 1000 up to about 3500, and still more preferably from about 1500 up to about 3500. The olefin polymer also preferably has at least one hydroxyl group on average per molecule. Preferably, the olefin polymer has from about 0.7 to about 10 hydroxyl groups on average per molecule, more preferably from about 1.7 to about 2.2 hydroxyl groups on average per molecule, and still more preferably about 2 hydroxyl groups on average per molecule. The hydroxyl-functional olefin polymer preferably has terminal hydroxyl groups and a hydroxyl equivalent weight of from about 1000 to about 3000. Molecular weight polydispersities of less than about 1.2, particularly about 1.1 or less, are preferred for these materials.

The olefin polymer is preferably a low molecular weight poly(ethylene/butylene) polymer having at least one hydroxyl group. In another embodiment the polyolefin polyol is a hydrogenated polybutadiene. Such hydrogenated polyolefin polyols are those available under the trademark POLYTAIL™ from Mitsubishi Chemical Corporation, Specialty Chemicals Company, Tokyo, Japan, including POLYTAIL™ H.

In one embodiment, a block copolymer is formed from the hydroxy-functional olefin polymer by reaction with a lactone or a hydroxy carboxylic acid to form an olefin-based polymer having (poly)ester end blocks. Lactones that can be ring opened by an active hydrogen are well-known in the art. Examples of suitable lactones include, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these. In one embodiment, the lactone is ε-caprolactone. Lactones useful in the practice of the invention can also be characterized by the formula:

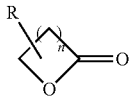

wherein n is a positive integer of 1 to 7 and R is one or more H atoms, or substituted or unsubstituted alkyl groups of 1-7 carbon atoms.

The lactone ring-opening reaction is typically conducted under elevated temperature (e.g., 80-150° C.). When the reactants are liquids a solvent is not necessary. However, a solvent may be useful in promoting good conditions for the reaction even when the reactants are liquid. Any non-reactive solvent may be used, including both polar and nonpolar organic solvents. Examples of useful solvents include, without limitation, Solvesso 100 (a mixed hydrocarbon solvent), Solvesso 150, (mixed hydrocarbon solvent), naptha, methyl propyl ketone, methyl ethyl ketone, methyl isobutyl ketone toluene, xylene, and the like and combinations of such solvents. A catalyst may be utilized. Useful catalysts include, without limitation, proton acids (e.g., octanoic acid, Amerlyst® 15 (Rohm & Haas)), and tin catalysts (e.g., stannous octoate). Alternatively, the reaction can be initiated by forming a sodium salt of the hydroxyl group on the molecules that will react with the lactone ring.

A hydroxy carboxylic acid can also be used instead of a lactone or in combination with a lactone as the compound that reacts with the hydroxyl-functional olefin polymer to provide ester blocks. Useful hydroxy carboxylic acids include, without limitation, dimethylhydroxypropionic acid, hydroxy stearic acid, tartaric acid, lactic acid, 2-hydroxyethyl benzoic acid, N-(2-hydroxyethyl)ethylene diamine triacetic acid, and combinations of these.

The reaction can be conducted under typical esterification conditions, for example at temperatures from room temperature up to about 150° C., and with catalysts such as, for example, calcium octoate, metal hydroxides like potassium hydroxide, Group I or Group II metals such as sodium or lithium, metal carbonates such as potassium carbonate or magnesium carbonate (which may be enhanced by use in combination with crown ethers), organometallic oxides and esters such as dibutyl tin oxide, stannous octoate, and calcium octoate, metal alkoxides such as sodium methoxide and aluminum tripropoxide, protic acids like sulfuric acid, or $Ph_4SbI$. The reaction may also be conducted at room temperature with a polymer-supported catalyst such as Amerlyst-15® (available from Rohm & Haas) as described by R. Anand in *Synthetic Communications*, 24(19), 2743-47 (1994), the disclosure of which is incorporated herein by reference.

While polyester segments may likewise be produced with dihydroxy and dicarboxylic acid compounds, it is preferred to avoid such compounds because of the tendency of reactions involving these compounds to increase the polydispersity of the resulting block copolymer. If used, these compounds should be used in limited amounts and preferably employed only after the lactone or hydroxy carboxylic acid reactants have fully reacted.

The reaction with the lactone or hydroxy carboxylic acid or oxirane compounds adds at least one monomer unit as the B block and preferably provides chain extension of the olefin polymer. In particular, the (poly)ester and/or (poly)ether block is thought to affect the polarity and effective reactivity of the end group functionality during curing of the coating.

The (poly)ester and/or (poly)ether block also makes the olefin-based block copolymer more compatible with components of a typical curable coating composition. The amount of the extension depends upon the moles of the alkylene oxide, lactone, and/or hydroxy carboxylic acid available for reaction. The relative amounts of the olefin polymer and the alkylene oxide, lactone, and/or hydroxy acid can be varied to control the degree of chain extension. The reaction of the lactone ring, oxirane ring, and/or hydroxy carboxylic acid with a hydroxyl group results in the formation of an ether or ester and a new resulting hydroxyl group that can then react with another available monomer, thus providing the desired chain extension. In the present invention, the equivalents of oxirane, lactone, and/or hydroxy carboxylic acid for each equivalent of hydroxyl on the olefin polymer are from about 0.5 to about 25, or from about 1 to about 10, or from about 2 to about 6. In a specific embodiment about 2.5 equivalents of lactone are reacted for each equivalent of hydroxyl on the olefin polymer.

In another embodiment of the invention, a polyolefin having terminal hydroxyl groups is reacted with an oxirane-containing compound to produce (poly)ether endblocks. The oxirane-containing compound is preferably an alkylene oxide or cyclic ether, especially preferably a compound selected from ethylene oxide, propylene oxide, butylene oxide, tetrahydrofuran, and combinations of these. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The hydroxyl group of the olefin-based polymer functions as initiator for the base-catalyzed alkylene oxide polymerization. The polymerization may be carried out, for example, by charging the hydroxyl-terminated olefin polymer and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition and polymerized in blocks by sequential addition.

Tetrahydrofuran polymerizes under known conditions to form repeating units

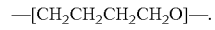

Tetrahydrofuran is polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of the olefin polymer.

The non-reactive functionality on either type of polyolefin polymer may be provided for example by reacting the hydroxyl functionality on the olefin polymer with an anhydride functional compound to provide an acid functionality. Suitable anhydride functional compounds include cyclic anhydrides derived from polycarboxylic acids wherein at least two of the acid groups are located beta or gamma (1,2 or 1,3) to form the cyclic anhydride though a dehydration reaction yielding the cyclic anhydride and water. The cyclic anhydride may also include other acid groups or halogen groups or aliphatic, olinic (unsaturated carbon chains), cycloaliphatic or aromatic side groups of chain lengths between 1 and 18 carbons. These must not interfere with formation of the cyclic anhydride. Examples of these include trimelaic anhydride, hexahyrophthalic, phthalic anhydride, tetrahydrophthallic anhydride, hexahydrophthalic anhydride, methyl hexahydrophthalic anhydride, maleic anhydride, succinic anhydride, glutaric anhydride, 2-dodecen-1-ylsuccinic anhydride, and dodecenylsuccinic anhydride. Mixtures of anhydrides may also be used. Thiol functionality may be obtained by forming a polyolefin halide and then reacting the halide with sodium hydrogen sulfide.

In another embodiment, a hydroxy functional olefin polymer can be reacted with an isocyanate functional pre-polymer. The isocyanate functional pre-polymer can be made by the reaction of a polyfunctional isocyanate with less than a stochiometric amount of a difunctional chain extension material having functional groups selected from the group consisting of polyols, polyamines, hydroxy amines and combinations thereof. Alternatively, or in addition, the polyfunctional isocyanate can be reacted with one or more capping agents that comprise a hydroxy or an amine group and an additional functional group that is essentially inert to the isocyanate under the reaction conditions. The amount of capping agent used must be less than the stochiometric amount of available isocyanate. To prevent unwanted molecular weight growth and/or gellation, the polyisocyanates such as diisocyanates including, but not limited to isophorone diisocyanate, hexane diisocyanate, toluene diisocyanate are effective. In most cases, the chain extension agents will be difunctional. Non-limiting examples of chain extension agents are 2-ethyl-hexane-1,3-diol, 1,6-hexanediamine, and 6-amino-hexane-1-ol. These chain extension agents can be extended prior to reaction with the polyisocyanate. A non-limiting example is the reaction of 1,6-hexanediol with a lactone. Non-limiting examples of capping agents are hydroxy alkyl carbamates such as hydroxy propyl carbamate, 1-hydroxy-pentanoic acid and 1-hydroxy-butyl amide. These capping agents can be extended by reaction with lactones.

The adhesion promoter polymer is used in a coating composition in an amount between about 0.01 and about 30% by weight based on total vehicle weight. Alternatively, the adhesion promoter polymer is used in an amount between about 3 to about 30% by weight, or between about 5 and about 20% by weight based on total vehicle weight. Vehicle is understood to be the resinous and polymer components of the coating composition, which includes film forming resins and polymers, crosslinkers, other reactive components such as the olefin-based block copolymer, the chlorinated polyolefin, and other reactive or nonreactive resinous or polymeric components such as acrylic microgels.

While not intending to be bound by theory, it is believed that the mechanism that results in adhesion of the coating to the substrate involves a migration of the olefin-based polymer or block copolymer to the olefinic or TPO substrate interface and an interaction with the olefinic or TPO substrate. It is believed that the migration and/or interaction is facilitated by application of heat, such as the heat applied to cure the coating composition. It is thought that the non-reactivity of the functional groups on the olefin-based polymer or copolymer toward the principal resin and crosslinker leaves the functionality available to provide adhesion between the coating and the olefinic or TPO substrate. It is believed that the hydrogen donor/acceptor nature of the groups enhances the adhesive properties of the substituted polyolefin polymer. Because the groups are essentially inert to reaction with a principal resin or a crosslinking resin in a coating composition, the groups remain essentially unreacted and in tact in the final coating system. By "essentially unreacted" or "essentially inert", is meant that only trace amounts or less than 8% and preferably less than 1% of the functional groups may react with principal resin or crosslinker.

The coating compositions of the invention may contain a wide variety of film-forming resins. At least one crosslinkable resin is included. The resin may be self-crosslinking, but typically a coating composition includes one or more crosslinking agents reactive with the functional groups on the film-forming resin. Film-forming resins for coating compositions typically have such functional groups as, for example, without limitation, hydroxyl, carboxyl, carbamate, urea, epoxide (oxirane), primary or secondary amine, amido, thiol, silane, and so on and combinations of these. The film-forming resin may be any of those used in coating compositions including, without limitation, acrylic polymers, vinyl polymers, polyurethanes, polyesters (including alkyds), polyethers, epoxies, and combinations and graft copolymers of these. Also included are polymers in which one kind of polymer is used as a monomer in forming another, such as a polyester-polyurethane, acrylic-polyurethane, or a polyether-polyurethane in which a dihydroxy functional polyester, acrylic polymer, or polyether is used as a monomer in the urethane polymerization reaction. Useful film-forming resins include acrylic, polyurethane and polyester polymers, including alkyds and mixtures of any of these. Useful acrylic resins include those having a hydroxyl number of between 95 and 225. In the case of waterborne compositions, the film-forming resin is emulsified or dispersed in the water. In one embodiment, a waterborne coating composition includes both a polyurethane and an acrylic resin. Many references describe film-forming polymers for curable coating compositions and so these materials do not need to be described in further detail here.

Film-forming resins may be included in amounts of from about 5 to about 99%, preferably from about 20 to about 80% of the total solid vehicle of the coating composition.

When the coating composition includes a curing agent, or crosslinker, the crosslinker is non-reactive with the olefin-based polymer or block copolymer under normal curing conditions. The curing agent has, on average, at least about two crosslinking functional groups. Suitable curing agents include, without limitation, materials having active methylol or methylalkoxy groups, such as aminoplast crosslinking agents or phenol/formaldehyde adducts, curing agents that have isocyanate groups, particularly blocked isocyanate curing agents; curing agents having epoxide groups; and combinations of these. Examples of specific curing agent compounds include melamine formaldehyde resins (including monomeric or polymeric melamine resin and partially or fully alkylated melamine resin), blocked or unblocked polyisocyanates (e.g., toluene diisocyanate, MDI, isophorone diisocyanate, hexamethylene diisocyanate, and isocyanurate trimers of these, which may be blocked for example with alcohols or oximes), urea resins (e.g., methylol ureas such as urea formaldehyde resin, alkoxy ureas such as butylated urea formaldehyde resin), polyanhydrides (e.g., polysuccinic anhydride), polysiloxanes (e.g., trimethoxy siloxane), and combinations of these. Unblocked polyisocyanate curing agents are usually formulated in two-package (2K) compositions, in which the curing agent and the film-forming polymer (in this case, at least the block copolymer) are mixed only shortly before application and because the mixture has a relatively short pot life. The curing agent may be combinations of these, particularly combinations that include aminoplast crosslinking agents. Aminoplast resins include melamine formaldehyde resins or urea formaldehyde resins.

The functionality on the olefin-based polymeric adhesion promoter functionality is selected so that it is not reactive with functional groups on either the principal resin or crosslinker in the coating composition. The functionality is selected from the group consisting of hydroxyl, acid, thiol, carbamate, urea, amine, phenol and amide groups and mixtures thereof, depending on its inertness to the functionality of the principal resin and crosslinker.

For example, where an isocyanate crosslinker or resin is used with a hydroxyl functional resin, the functional group on the adhesion promoter is selected from the group consisting of amides, phenol, carbamates, acid and mixtures thereof. The functional group on the olefin-based adhesion promoter may be obtained for example, by reacting a hydroxyl functional olefinic polymer produced by hydrogenation of a polyhydroxylated polydiene polymer with a compound to provide acid, thiol, carbamate, urea, amine phenol, or amide functionality that does not react with the hydroxyl functionality on the principal resin or the isocyanate functionality on the crosslinker.

For example, when an epoxy functional principal resin and acid crosslinker or acid functional principal resin with epoxy crosslinker, or an ultraviolet radiation curable principal resin and crosslinker are used, the functionality on the adhesion promoter may be selected from the group consisting of alcohols, amides, carbamates, phenol and urea and mixtures thereof.

Aminoplast resins such as melamine formaldehyde resins or urea formaldehyde resins are specific example of crosslinkers for resins having hydroxyl, carbamate, and/or urea functional groups. Where the crosslinker is aminoplast, the functionality on the adhesion promoter is acid or thiol.

A coating composition comprising the olefin-based polymer or block copolymer adhesion promoter may further include other components, including and without limitation for example, chlorinated polyolefin, additional adhesion promoters, catalysts suitable for reaction of the particular crosslinker, solvents including water and organic solvents, surfactants, stabilizers, matting agents, wetting agents, rheology control agents, dispersing agents, adhesion promoters, pigments, fillers, uv absorbers, hindered amine light stabilizers, silicone additives, customary coatings additives, and combinations of these. Suitable pigments and fillers include, without limitation, conductive pigments, including conductive carbon black pigments and conductive titanium dioxide pigments; non-conductive titanium dioxide and carbon pigments, graphite, magnesium silicate, ferric oxide, aluminum silicate, barium sulfate, aluminum phosphomolybdate, aluminum pigments, and color pigments. The pigments and, optionally, fillers are typically included at a pigment to binder ratio of from about 0.1 to about 0.6, preferably from about 0.1 to about 0.25.

The adhesion promoter olefin-based polymer of the invention can be applied directly to a substrate or combined with a chlorinated polyolefin adhesion promoter for direct application to a substrate, or the olefin-based polymer may be used as a component of a coating composition. The adhesion promoter is particularly useful for olefinic substrates like TPO to provide excellent adhesion of subsequent coating layers to the substrates. Use of the olefin polymer improves coating performance following gasoline immersion testing.

Where the adhesion promoter olefin-based polymer is combined with a chlorinated polyolefin good adhesion following exposure to humidity testing is obtained. Some examples of chlorinated polyolefins can be found in U.S. Pat. Nos. 4,683,264; 5,102,944; and 5,319,032. Chlorinated polyolefins are known in the art and are commercially available form various companies, including Nippon Paper, Tokyo, Japan, under the designation Superchlon; Eastman Chemical Company, Kingsport, TN under the designation CPO; and Toyo Kasei Kogyo Company, Ltd., Osaka, Japan under the designation Hardlen. Examples of non-chlorinated adhesion promoters include AP-550-1 from Eastman Chemical.

The coating compositions of the invention may comprise chlorinated polyolefin in an amount between 0 and about 25% by weight, and in some embodiments between about 0.001% and about 25% by weight, or between about 1.0 and 15.0% by weight, or between 1.0 and 10.0% by weight, based on total vehicle weight.

In one embodiment, the coating comprises only a solution or dispersion that includes only or essentially only the olefin-based block copolymer and chlorinated polyolefin as the vehicle components. In this embodiment, it is preferred to first apply the adhesion promoter directly to the, plastic substrate and then to apply a layer of a coating composition. Applying coating layers "wet-on-wet" is well known in the art.

For this embodiment of the adhesion promoter, the applied adhesion promoter may be either coated "wet on wet" with one or more coating compositions and then all layers cured together, or the adhesion promoter layer may be partially or fully cured before being coated with any additional coating layers. Curing under any of these conditions allows subsequent coating layer(s) to be applied electrostatically when the adhesion promoter is utilized with or without conductive pigments, for example as conductive carbon black or conductive titanium dioxide, according to methods known in the art.

The use of the adhesion promoter polymer or copolymer of the present invention increases the conductivity of the primer system and reduces the amount used or eliminates the conductive pigment used in the coating composition. Improved conductivity increases topcoat transfer efficiency in electrostatic spray systems.

Curing the adhesion promoter layer before applying an additional coating layer may allow the subsequent coating layer to be applied electrostatically when the adhesion promoter is formulated with a conductive pigment such as conductive carbon black or conductive titanium dioxide, according to methods known in the art.

The adhesion promoter polymer can be added to a variety of coating compositions to produce coating compositions that have excellent adhesion to plastic substrates, particularly to olefinic substrates, including TPO. Compositions in which the combination of the polymeric adhesion promoter may be used include primers, one-layer topcoats, basecoats, and clearcoats.

The adhesion promoter or coating composition used in the practice of the invention may include a catalyst to enhance the cure reaction. For example, when aminoplast compounds, especially monomeric melamines, are used as a curing agent, a strong acid catalyst may be utilized to enhance the cure reaction. Such catalysts are well-known in the art and include, without limitation, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

A solvent may optionally be included in the adhesion promoter or coating composition used in the practice of the present invention, and preferably at least one solvent is included. In general, the solvent can be any organic solvent and/or water. It is possible to use one or more of a broad variety of organic solvents. The organic solvent or solvents are selected according to the usual methods and with the usual considerations. In the present invention, the solvent is present in the coating composition in an amount of from about 0.01 weight percent to about 99 weight percent. Typically, in organic solventborne compositions solvent is present from about 5 weight percent to about 70 weight percent, and for topcoat compositions from about 10 weight percent to about 50 weight percent. In a preferred embodiment, the coating has less than 4% HAPS.

In another embodiment, the solvent is water or a mixture of water with any of the typical co-solvents employed in aqueous dispersions. When the olefin-block copolymer is to be used in a waterborne composition, it is advantageous to include in the block copolymer at least one polyethylene oxide segment or ionizable group to aid in dispersing the material. When modified with a polyethylene oxide segment or ionizable group, the block copolymer of the invention may be dispersed in water, optionally with other components (crosslinkers, additives, etc.) and then applied as an adhesion promoter or added to an aqueous coating composition as an aqueous dispersion of the block copolymer. Alternatively, the block copolymer may be blended with the film-forming polymer and then dispersed in water along with the film-forming polymer. In the latter method, it is contemplated that the block copolymer need not be modified with a hydrophilic segment, and instead the affinity of the block copolymer for the film-forming vehicle can be relied upon to maintain the components in a stable dispersion.

The coating compositions of the invention can be formulated as either one-component (one-package or 1K) or two-component (two-package or 2K) compositions, as is known in the art.

The adhesion promoter and coating compositions can be coated on an article by any of a number of techniques well-known in the art. These include, without limitation, spray coating, dip coating, roll coating, curtain coating, and the like. Spray coating is preferred for automotive vehicles or other large parts.

The adhesion promoter and optionally chlorinated polyolefin can be added to a topcoat coating composition in amounts that do not substantially alter the gloss of the topcoat. In one application, for example, the olefin-based block copolymer is utilized in a topcoat composition that produces a high-gloss cured coating, preferably having a 20° gloss (ASTM D523-89) or DOI (ASTM E430-91) of at least 80 that would be suitable for exterior automotive components.

In another application, the olefin-based block copolymer may be included in a topcoat or primer composition that produces a low gloss coating, such as for coating certain automotive trim pieces. Typical low gloss coatings have a gloss of less than about 30 at a 60° angle. The low gloss may be achieved by including one or more flatting agents. Low gloss primer compositions are often used to coat automotive trim pieces, such as in a gray or black coating. The low gloss primer is preferably a weatherable composition because the low gloss primer may be the only coating applied to such trim pieces. In the case of a weatherable primer, the resins are formulated to be light-fast and the composition may include the usual light stabilizer additives, such as hindered amine light stabilizers, UV absorbers, and antioxidants.

When the coating composition of the invention is used as a high-gloss pigmented paint coating, the pigment may include any organic or inorganic compounds or colored materials, fillers, metallic or other inorganic flake materials such as mica or aluminum flake, and other materials of kind that the art normally names as pigments. Pigments are usually used in the composition in an amount of 0.2% to 200%, based on the total solid weight of binder components (i.e., a pigment-to-binder ratio of 0.02 to 2). As previously mentioned, adhesion promoters preferably include at least one conductive pigment such as conductive carbon black pigment, conductive titanium dioxide, conductive graphite, conductive silica-based pigment, conductive mica-based pigment, conductive antimony pigment, aluminum pigment, or combinations of these, in an amount that makes the coating produced suitable for electrostatic applications of further coating layers.

The adhesion promoters and coating compositions can be applied at thicknesses that will produce dry film or cured film thicknesses typical of the art, such as from about 0.01 to about 5.0 mils. Typical thicknesses for adhesion promoter layers are from about 0.1 to about 0.5 mils, preferably from about 0.2 to about 0.3 mils. Typical thicknesses for primer layers are from about 0.5 to about 2.0 mils, preferably from about 0.7 to about 1.5 mils. Typical thicknesses for basecoat layers are from about 0.2 to about 2.0 mils, preferably from about 0.5 to about 1.5 mils. Typical thicknesses for clearcoat layers or one-layer topcoats are from about 0.5 to about 3.0 mils, preferably from about 1.5 to about 2.5 mils.

After application to the substrate, the adhesion promoters and coating compositions of the invention are heated to facilitate interaction with the substrate and thus to develop the adhesion of the applied composition to the substrate. Preferably, the coated substrate is heated to at least about the softening temperature of the plastic substrate. The adhesion promoters and coating compositions are preferably thermally cured. Curing temperatures will vary depending on the particular blocking groups used in the crosslinking agents, however they generally range between 160° F. and 270° F. The curing temperature profile must be controlled to prevent warping or deformation of the TPO substrate or other plastic substrate. The first compounds according to the present invention are preferably reactive even at relatively low cure temperatures. Thus, in a one embodiment, the cure temperature is preferably between 225° F. and 270° F., and in another embodiment at temperatures no higher than about 265° F. The curing time will vary depending on the particular components used, and physical parameters such as the thickness of the layers, however, typical curing times range from 15 to 60 minutes, and preferably 20-35 minutes. The curing conditions depend upon the specific coating composition and substrate, and can be discovered by straightforward testing.

The coating compositions of the invention are particularly suited to coating olefinic substrates, including, without limitation, TPO substrates, polyethylene substrates, and polypropylene substrates. The coating compositions may also be used, however, to coat other thermoplastic and thermoset substrates, including, without limitation, polycarbonate, polyurethane, and flexible substrates like EPDM rubber or thermoplastic elastomers. Such substrates can be formed by any of the processes known in the art, for example, without limitation, injection molding and reaction injection molding, compression molding, extrusion, and thermoforming techniques.

The materials and processes of the invention can be used to form a wide variety of coated articles, including, without limitation, appliance parts, exterior automotive parts and trim pieces, and interior automotive parts and trim pieces.

The invention is further described in the following examples. The examples are merely illustrative and do not in any way limit the scope of the invention as described and claimed. All parts are parts by weight unless otherwise noted.

Preparation of Olefin Polymer

EXAMPLE 1

323.6 parts of a solution of hydroxy functional hydrogenated polybutadiene polymer (POLYTAIL™ from Mitsubishi Chemical Corporation, Specialty Chemicals Company, Tokyo, Japan) was combined with a, 138.8 parts of 6-hexanolactone and 858.9 parts of Hi Sol 10 aromatic solvent (Ashland Chemical Company) and heated under an inert atmosphere to 115° C. Then 0.82 parts of Stannous Octoate was added along with 7 parts of Hi Sol 10. The reaction was heated to 145° C. and held at this temperature for four hours. The reaction mixture was then cooled to 60° C. and 1720.4 parts of Hi Sol 10 was added. Then a mixture of 231 parts chlorinated polyolefin (Superchlon 872S Nippon Paper Industries), 4.7 parts of the diglycidyl ester of bisphenol A and 7 parts of Hi Sol 10 was added. While stirring the mixture was then allowed to slowly cool to room temperature. The final product had a NV of 19.6%.

EXAMPLE 2

828.9 parts of the resin made as described in Ex. 1 was heated under an inert atmosphere to 115° C. Then 10.5 parts of methyl hexahydrophthalic anhydride was added. The reaction was held at 115° C. until the reaction was complete (as determined by titration or IR analysis). The reaction mixture was then taken to 60° C. and allowed to slowly cool to room temperature while stirring. The final product had a NV of 19.7%.

EXAMPLE 3

A solution of 99.8 parts of PolyTail H, 42.7 parts of 6-hexanolacton and 255.2 parts of Hi Sol 10 aromatic solvent was heated to 115° C. under an inert atmosphere. Then 0.2 parts of Stannous Octoate added along with 2.1 parts of Hi Sol 10. The reaction was heated to 145° C. and held at this temperature for four hours. The reaction mixture was then taken to 115° C. and 15.1 parts of methyl hexahydrophthalic anhydride was added. After a mild exotherm (118° C.), the reaction mixture was stirred at 115° C. until the reaction was complete (as determined by titration or IR analysis). The reaction mixture was then taken to 60° C. and 517.8 parts of Hi Sol 10 was added followed by 69.5 parts of Superchlon 872S and an additional 100 parts of Hi Sol 10. While stirring, the mixture was then allowed to slowly cool to room temperature. The final product had a NV of 20.0%.

EXAMPLE 4

A solution of 255.6 parts of PolyTail H and 255.6 parts of Hi Sol 10 was heated under an inert atmosphere to 115° C. Then 35.6 parts of methyl hexahydrophthalic anhydride was added. The reaction mixture was allowed to exotherm to 120° C. It was then held at 115° C. until the reaction was complete as determined by titration or IR analysis. The reaction mixture was then taken to 60° C. and 1399.5 parts of Hi Sol 10 and 145.5 parts of Superchlon 872S was added. The mixture was taken to 70° C. then allowed to slowly cool to room temperature with stirring. The final product had a NV of 20.5%.

Coating Compositions

Coating compositions were prepared having the following formulations. Amounts are shown as percentage of 100 lbs of total coating composition. The amount shown in ( ) is % non-volatile content of coating composition.

| Component | Examples | | | |
| --- | --- | --- | --- | --- |
| | A | B | C | D |
| Acrylic[1] | 12.7 (20.88) | 12.0 | 11.1 | 10.3 |
| Polyester[2] | 5.9 (19.31) | 5.6 | 5.1 | 4.8 |
| Melamine[3] | 1.1 (3.77) | 1.1 | 1.0 | 0.9 |
| Acid Functional Polymer prepared from polybuatdiene[4] | 15 (10.15) | 14.9 | 14.8 | 14.7 |
| Chlorinated Polyolefin[5] | — | 4.1 | 9.4 | 14.8 |
| Pigment Dispersion[6] | 13.9 (45.9) | 13.6 | 13.5 | 13.5 |
| Catalyst[7] | 0.1 | — | — | — |
| Solvent | 51.3 | 48.6 | 45.0 | 40.8 |

[1]Acrylic resin 70% nonvolatile in aromatic solvents, hydroxyl number of 97 mg KOH/gram, available from BASF Corporation
[2]Tone 0310 polyester resin available from Dow Chemical Company
[3]RESIMENE 747 melamine
[4]Resin from Example 4
[5]Chlorinated polyolefin sold under the trademark Superclon 892 (20% nonvolatile in a mixture of toluene, cyclohexane and isopropanol, available from Nippon Paper, Tokyo, Japan) Example 1.
[6]Pigment dispersion of conductive carbon black, fumed silica and titanium dioxide
[7]Dodecylbenzene sulfonic acid Coating Compositions were prepared by mixing materials together and milling through a horizontal mill to a minimum particle size of 20 microns. Viscosity was adjusted for application to about 14 seconds in a #4 Ford cup. Grind level, wet resistivity and physical appearance were recorded. Coatings were applied to a TPO substrate with a hand-held BINKS siphon spray gun to a dry film build of 2.4 mils. Dry conductivity was evaluated every 2 minutes for 10 minutes and again after baking. Panels were top coated after 10 minutes flash-off at ambient temperature with 1.0 MILS of a white high solids BASF basecoat and 2.0 mils of a high solids one component clearcoat. After another 10 minute flash panels were baked for 30 minutes at 250° F. and tested under the conditions set forth below. Panels were post-cured for three days, then tested for humidity adhesion performance according to GM4465P and gas immersion according to GM 9501 protocol.

Table 1-Conductivity Measurement

Conductivity was measured every two minutes. Measurements are in Ransburg units and 170 is the maximum measurement. 140 is generally considered to be the minimum reading necessary for electrostatic efficiency. The shorter the amount of time to reach maximum conductivity the better because this allows a faster application of the topcoats over the primer which can translate to a shorter or faster production. Results of conductivity testing are set forth in Table 1.

TABLE 1

| | Conductivity Results | | | | | | |
|---|---|---|---|---|---|---|---|
| | MINUTES ELAPSED | | | | | | |
| | Unbaked | | | | | | Baked 30 min |
| Coating Example | 2 | 4 | 6 | 8 | 10 | 20 | @250° F. |
| EX A | 155 | 170 | 170 | 170 | 170 | 170 | 170 |
| EX B | 160 | 170 | 170 | 170 | 170 | 170 | 170 |
| EX C | 165 | 170 | 170 | 170 | 170 | 170 | 170 |
| EX D | 165 | 170 | 170 | 170 | 170 | 170 | 170 |
| Comparative 1[a] | 83 | 105 | 125 | 125 | 125 | 125 | 155 |
| Comparative 2[b] | 140 | 150 | 165 | 165 | 165 | 165 | 170 |

[a]Commercially available adhesion promoter containing coating from Rohm and Haas sold as R&H 21054
[b]Commercially available adhesion promoter containing coating from PPG sold as MPP 41000.

We claim:

1. A coating composition comprising film forming components and an adhesion promoter comprising an olefin-based polymer having a functionality thereon that is essentially unreacted with the film forming components of the coating composition when subjected to curing conditions, wherein the film forming components comprises a principal, film-forming resin and a melamine formaldehyde crosslinker reactive with the principal, film-forming resin when the coating composition when subjected to curing conditions;
wherein said olefin-based polymer has at least one acid functional group and
wherein said olefin-based polymer is a block copolymer formed by reacting a substantially saturated olefin polymer with a lactone chain-extension reagent.

2. A coating composition according to claim 1 wherein the olefin-based polymer has a number average molecular weight between about 1,000 and 10,000.

3. A coating composition according to claim 1, wherein the olefin-based block copolymer has a structure of

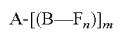

$$A\text{-}[(B\text{—}F_n)]_m$$

in which A represents an olefin block, B represents a (poly) ester block formed with the lactone chain extension agent, F is an acid functional group and m is on average from about 0.7 to about 10 and n is on average from 2 to 4.

4. A coating composition according to claim 3, wherein m is on average about 1.8 to about 2.

5. A coating composition according to claim 1, wherein said block copolymer has a hydroxyl equivalent weight of from about 1000 to about 3000.

6. A coating composition according to claim 1, wherein said block copolymer has a polydispersity of about 1.2 or less.

7. A coating composition according to claim 1, wherein said chain-extension reagent comprises epsilon-caprolactone.

8. A coating composition according to claim 1 wherein the olefin-based polymer is present in an amount between about 0.01 and about 30% by weight based on total vehicle weight.

9. A coating composition according to claim 8 wherein the olefin-based polymer is present in an amount between about 3 to about 30% by weight, based on total vehicle weight.

10. A coating composition according to claim 9 wherein the olefin-based polymer is present in an amount or between about 5 and about 20% by weight based on total vehicle weight.

11. A coating composition according to claim 1 further comprising an additional adhesion promoter composition.

12. A coating composition according to claim 11 wherein the additional adhesion promoter composition is a chlorinated polyolefin.

13. A coating composition according to claim 12 wherein the chlorinated polyolefin is present in an amount between about 0.001% and about 25% by weight, based on total vehicle weight.

14. A coating composition according to claim 11 wherein the chlorinated polyolefin is present in an amount between about 1.0 and 10.0% by weight, based on total vehicle weight.

15. A coating composition according to claim 12, wherein said olefin-based polymer and said chlorinated polyolefin are each independently present in an amount from about 3% to about 10% by weight of the total weight of vehicle of the coating composition.

16. A coating composition according to claim 1, further comprising at least one conductive pigment selected from the group consisting of conductive carbon black pigment, conductive titanium dioxide pigment, conductive graphite, conductive silica-based pigment, conductive mica-based pigment, conductive antimony pigment, aluminum pigment, and combinations thereof.

17. A coating composition according to claim 1 comprising a primer containing conductive pigment wherein the conductivity of the system is improved by at least 10%.

* * * * *